(12) United States Patent
Williams et al.

(10) Patent No.: US 8,204,053 B1
(45) Date of Patent: Jun. 19, 2012

(54) SYSTEMS AND METHODS FOR PROVIDING NETWORK SERVICES FOR RECORDING

(75) Inventors: Jamie Richard Williams, Fleet (GB); Marc Calahan, Woodstock, GA (US); Robert John Barnes, Watford (GB)

(73) Assignee: Verint Americas, Inc., Roswell, GA (US)

( * ) Notice: Subject to any disclaimer, the term of this patent is extended or adjusted under 35 U.S.C. 154(b) by 396 days.

(21) Appl. No.: 12/354,804

(22) Filed: Jan. 16, 2009

Related U.S. Application Data (60) Provisional application No. 61/021,466, filed on Jan. 16, 2008, provisional application No. 61/021,455, filed on Jan. 16, 2008.

(51) Int. Cl.
*H04L 12/28* (2006.01)

(52) U.S. Cl. .................................. 370/389; 370/401

(58) Field of Classification Search .............. 370/389, 370/390, 392, 401
See application file for complete search history.

(56) References Cited

U.S. PATENT DOCUMENTS

| 7,003,087 | B2* | 2/2006 | Spencer et al. | 379/211.01 |
|---|---|---|---|---|
| 7,035,252 | B2* | 4/2006 | Cave et al. | 370/356 |
| 7,307,980 | B1* | 12/2007 | Shah | 370/352 |
| 7,548,539 | B2* | 6/2009 | Kouretas et al. | 370/356 |
| 7,613,290 | B2* | 11/2009 | Williams et al. | 379/265.07 |
| 7,680,264 | B2* | 3/2010 | Dong et al. | 379/266.1 |
| 7,873,035 | B2* | 1/2011 | Kouretas et al. | 370/356 |
| 7,881,471 | B2* | 2/2011 | Spohrer et al. | 380/257 |
| 2007/0133528 | A1* | 6/2007 | Jin et al. | 370/389 |
| 2007/0201454 | A1* | 8/2007 | Weir et al. | 370/356 |
| 2007/0244891 | A1* | 10/2007 | Gopalan et al. | 707/7 |
| 2008/0002719 | A1* | 1/2008 | Byrd et al. | 370/395.52 |
| 2008/0148405 | A1* | 6/2008 | Davids et al. | 726/23 |

* cited by examiner

*Primary Examiner* — Hong Cho
(74) *Attorney, Agent, or Firm* — McKeon, Meunier Carlin & Curfman (57) ABSTRACT

IP packets associated with a communication are received at a first network device in an IP recording system. The first network device communicates to other devices in the IP recording network to receive a determination if the IP packets associated with the communication are to be recorded. The first network device may then be instructed to direct the IP packets associated with the communication to a recording device. In some implementations, the IP packets may duplicated, encrypted, re-encoded, compressed, etc. prior to recording.

8 Claims, 7 Drawing Sheets

SYSTEMS AND METHODS FOR PROVIDING NETWORK SERVICES FOR RECORDING

CROSS-REFERENCE TO RELATED APPLICATION

The present application claims priority to U.S. Provisional Patent Application Ser. No. 61/021,466, and titled "RECORDING USING A MEDIA RELAY", filed on Jan. 16, 2008. This application further claims priority to U.S. Provisional Patent Application Ser. No. 61/021,455, and titled "GATEWAY RECORDING", filed on Jan. 16, 2008. The contents of both applications are hereby incorporated by reference in their entirety.

BACKGROUND

Recording of communications is important to many industries, particularly those in which compliance regulations have been implemented. In this regard, a traditional passive tap Internet Protocol (IP) recording technique includes recorders that are deployed along routes of communications. In this technique, each recorder operates similar to a "sniffer" by analyzing pass-by communication IP packets. Each recorder detects the packets corresponding to certain communication sessions, locally stores the sessions by gathering the corresponding packets, and then directs the recorded sessions to long term storage. Clearly, interfacing such recorders with the communication network in the proper locations is required to ensure that the desired communications are detected and ultimately recorded.

SUMMARY

In an implementation, IP packets associated with a communication are received. A determination is made that the IP packets associated with the communication are to be recorded. A gateway is instructed to direct the IP packets associated with the communication to a recording device.

Implementations may include one or more of the following features. One or more of the IP packets associated with the communication may include a response for an interactive voice response system, and the determination that the IP packets associated with the communication are to be recorded may be made if the response for the interactive voice response system matches one or more predetermined commands. The communication may be associated with an Automatic Number Identifier (ANI), and the determination that the IP packets associated with the communication are to be recorded may be made if the ANI associated with the communication matches a specified ANI. The communication may be associated with a destination, and the determination that the IP packets associated with the communication are to be recorded may be made if the destination associated with the communication matches a specified destination. The determination that the IP packets associated with the communication are to be recorded may include randomly determining that IP packets associated with the communication are to be recorded. The gateway may be instructed to change a codec associated with the IP packets or to encrypt the IP packets.

In another implementation, a media relay point is placed between a first network device and a second network device on a network. The first network device and second network device are adapted to send and receive Internet Protocol (IP) packets associated with a communication. The media relay point is used to receive the IP packets associated with the communication and sent and received between the first network device and the second network device. The media relay point is used to perform a network service on the received IP packets.

Implementations may include one or more of the following features. The first network and second network devices may each independently be one of a gateway, a switch, and a phone. The network service may be a codec, and using the media relay point to perform a network service on the received IP packets may include using the media relay point to change a codec of the received IP packets. The network service may be encryption, and using the media relay point to perform a network service on the received IP packets may include using the media relay point to encrypt the received IP packets. The network service may be recording, and using the media relay point to perform a network service on the received IP packets may include using the media relay point to direct the received IP packets to a recording device. The media relay point may be implemented at one of a switch, a gateway, and a phone. The communication may be one of an audio and a video communication.

Implementations may realize some or none of the following advantages. Providing recording as a network service at the gateway avoids the need to insert recording devices in a call path. Because incoming and outgoing communications pass through the gateway, implementing recording as a network service at the gateway may prevent the loss of recordings or IP packets and may provide greater recording flexibility than a recording device inserted somewhere in the call path.

The use of media relay points may allow advanced network services to be provided on a network to legacy or third party network devices. In particular, media relay points may enable recording as a network service for communication devices that are either not compatible with, or that do not otherwise support, recording as a network service. Media relay points may be enabled or disabled at various existing network devices allowing for flexibility in the placement and availability of network services to network devices on the network.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
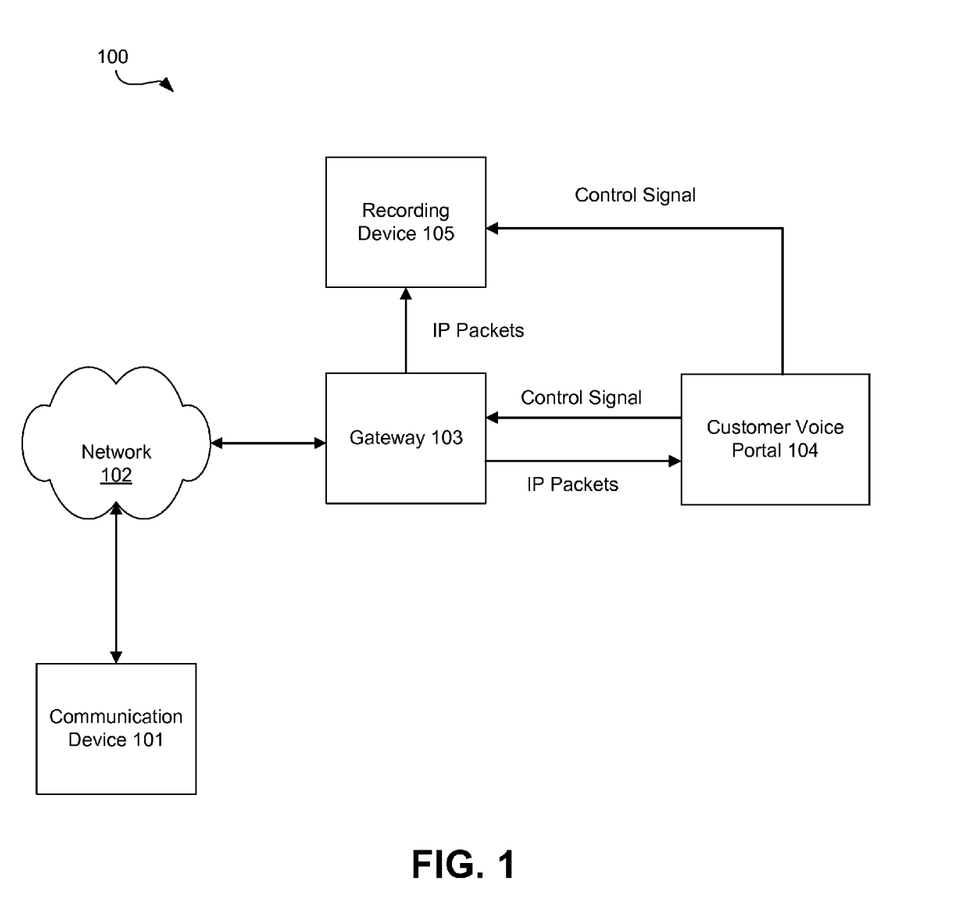
FIG. 1 is an illustration of an example system for providing recording as a network service.

FIG. 1 is an illustration of an example system 100 for providing recording as a network service. As shown, the system 100 includes a communication device 101 communicating with a gateway 103 through a network 102. The network 102 may be a variety of network types including the public switched telephone network (PSTN), a cellular telephone network, and a packet switched network (e.g., the Internet).

The communication device 101 may be one of a variety of communication device types such as a telephone, a cellular phone, video phone, and a Voice over IP (VoIP) phone. The communication device 101 may further be a computer (e.g., desktop, laptop, personal digital assistant (PDA) or other type of portable computer) running communication software such as a soft phone, for example. A variety of other types of communication devices may be used. While only one communication device 101 is shown, it is for illustrative purposes only. Multiple communication devices 101 may be supported by the system 100.

The gateway 103 may receive communications (e.g., phone calls) through the network 102 from a user of the communication device 101. For example, in some implementations, the gateway 103 may be located at a customer service call center and may receive communications from one or more customers using communication devices 101, and facilitate communication between the customers and one or more call agents at the customer service call center.

The gateway 103 may receive communications through the network 102 and convert the communications into IP Packets. For example, where the communication is received through the PSTN, the gateway 103 may convert the PSTN communication into IP packets. Other types of packets may be used such as Real Time Transfer Protocol (RTP) packets and Compressed Real Time Transfer Protocol (CRTP) packets, for example.

The gateway 103 may convert the communication into IP packets using a variety of codecs including G.711, G.726, GSM, iLBC, and Speex, for example. Other codecs may also be used.

The gateway 103 may forward the generated IP packets associated with the communication to a customer voice portal 104. The gateway 103 may forward the IP packets directly to the customer voice portal 104, or may forward the IP packets indirectly to the customer voice portal 104 (e.g., the IP packets may be forwarded through one or more switches or other network devices (not shown)).

The customer voice portal (CVP) 104 may implement one or more interactive voice response systems (IVRS). For example, the customer voice system 104 may be part of a customer service call center. When a communication (e.g., a phone call) is received by the gateway 103 from a customer through a communication device 101, the gateway 103 may generate IP packets from the communication and forward the packets to the customer voice portal 104. The IVRS implemented by the customer voice portal 104 may then generate one or more IP packets including audio providing the customer with information or asking the customer to speak or select an option (e.g., "press 1 for English . . . press 2 for Spanish").

The customer voice portal 104 may then forward the generated IP packets (directly or indirectly) to the gateway 103. The gateway 103 may then convert the IP packets into a format suitable for transmission to the communication device 101 (e.g., audio) and the communication may then be sent to the communication device 101. The customer operating the communication device 101 and the customer voice portal 104 may then continue to interact as described above.

The gateway 103 may include functionality to record the communication between the communication device 101 and the customer voice portal 104. The gateway 103 may record the communication upon receiving instructions from the customer voice portal 104, by default (e.g., record all communications), or based on a determination by the gateway 103 itself. In some implementations, the customer voice portal 104 may instruct the gateway 103 to record the communication using a control signal. The control signal may be sent using the Session Initiation Protocol (SIP). Other types of protocols may be used.

The gateway 103 may record a communication using one or more recording devices 105. The gateway 103 may record a communication by copying the IP packets associated with the communication and directing the associated IP packets to the recording device 105. The recording device 105 may then receive the IP packets, and store the received IP packets as the communication.

The recording device 105 may further transform the stored communication. For example, the recording device 105 may convert the IP packets into a human understandable format, such as an audio stream. The recording device 105 may also encrypt the communication, compress the communication, or adjust the audio quality of the communication to reduce the amount of storage needed for the communication. The particular transformations performed by the recording device 105 may be predetermined, set by an administrator, or specified by the customer voice portal 104 using a control signal, for example.

The customer voice portal 104 may determine if a communication (i.e., the IP packets associated with the communication) is to be recorded by the gateway 103. The customer voice portal 104 may make the determination based on a variety of factors. In some implementations, the customer voice portal 104 may determine if a communication should be recorded based on the inputs or responses provided by the customer while interacting with the IVRS. For example, if the customer presses '0', has not provided an input for more than a threshold amount of time, cannot be understood, or speaks one or more "flagged" words such a profanities, the customer voice portal 104 may instruct the gateway 103 to record the communication. Other customer interactions may be used by the customer voice portal 104 to determine that a communication is to be recorded.

In some implementations, the customer voice portal 104 may determine if a communication is to be recorded based on an Automatic Number Identifier (AIN) or a Dialed Number Identification (DNI) associated with the communication. For example, the AIN or DNI may be compared with one or more specified AINs or DNIs, and if the AIN or DNI matches a specified AIN or DNI, the customer voice portal 104 may determine that the communication is to be recorded.

In some implementations, the customer voice portal 104 may randomly determine if a communication should be recorded. For example, a customer service call center may desire that a certain percentage (e.g., 5%, 10%, 50%, or 100%) of communications be recorded. The customer voice portal 104 may then randomly determine that a communication is to be recorded according to the desired percentage.

Other factors may also be used to determine if a communication is to be recorded. For example, if a customer has made several communications in the past, the customer is located in a particular geographic region or city, or the communication is associated with one or more predetermined network addresses, the customer voice portal 104 may determine that the communication is to be recorded.

In some implementations, the gateway 103 may make a determination if a communication is to be recorded rather than the customer voice portal 104. For example, where a certain percentage of communications are to be recorded, the gateway 103 may randomly determine that a communication is to be recorded according to the specified percentage. Other factors may also be used by the gateway 103 to determine if a communication is to be recorded.

The gateway 103 may further direct additional tag and event information associated with the communication to the recording device 105. The tag information may include the AIN, DNI, or other attributes associated with the communication. The event information may include events such as "ringing", call transfers, and call hold events, for example. The tag and event information may be recorded by the recording device 105 along with the IP packets.

Figure 2:
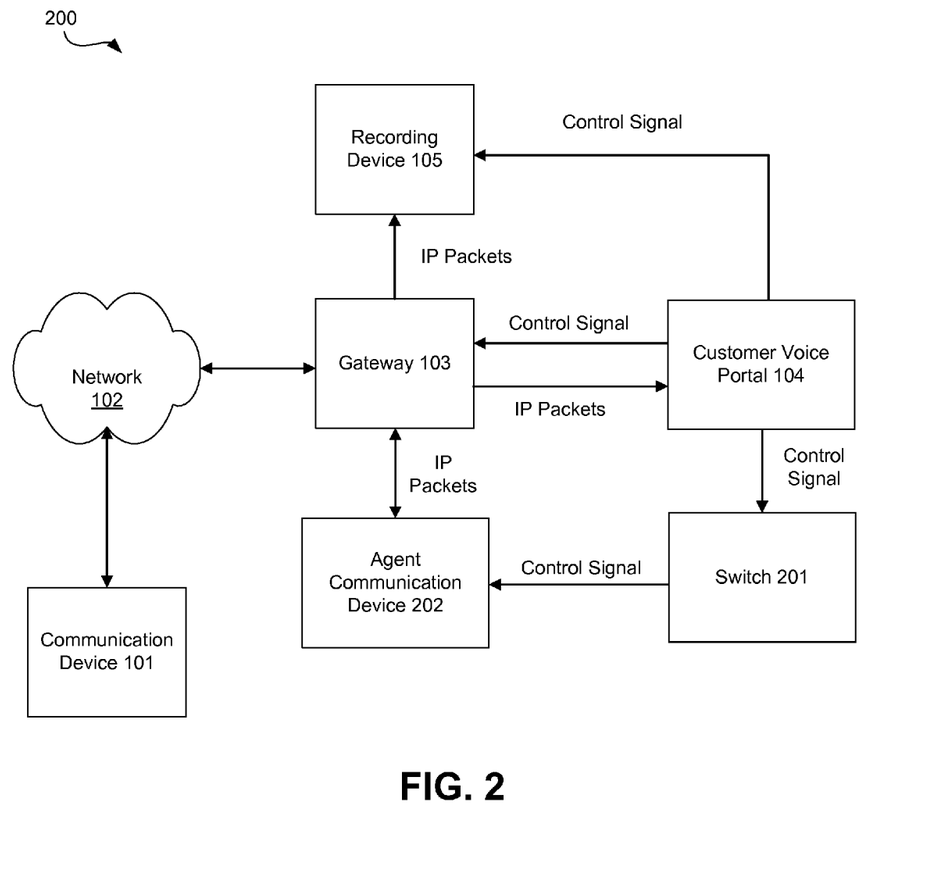
FIG. 2 is another illustration of an example system for providing recording as a network service.

FIG. 2 is an illustration of an example system 200 for providing recording as a network service. As shown, the system 200 includes the communication device 101, the network 102, the gateway 103, the customer voice portal 104, and the recording device 105 of the system 100 described above in FIG. 1. In addition, the system 200 includes a switch 201 and an agent communication device 202.

The agent communication device 202 may be one of a variety of known communication devices including the communication devices described above with respect to the communication device 101. The agent communication device 202 may be operated by a customer service agent working at a customer service call center, for example. While only one agent communication device 202 is shown, it is for illustrative purposes only. A variety of agent communication devices 202 may be supported by the system 200.

Similar to the system 100, a communication has been established between a customer using a communication device 101 and the customer voice portal 104 through the gateway 103. Further, the communication may be recorded by the gateway 103 by directing IP packets associated with the communication to the recording device 105. At some point during the communication, the customer voice portal 104 may determine that it is necessary for the customer using the communication device 101 to speak with an agent or customer service representative at the agent communication device 202. For example, the customer voice portal 104 may have received one or more IP packets associated with the communication that indicate that the user has requested to speak with a customer service agent, a threshold duration of time has been exceed by the communication, or the customer has become unresponsive, etc.

Accordingly, the customer voice portal 104 may transfer the communication to the agent communication device 202. In some implementations, the customer voice portal 104 may transfer the communication by instructing a switch 201 to select an agent communication device 202 that is currently not handling another communication, or if no agent communication device 202 is available, to put the communication on "hold" until an agent communication device 202 is available to receive the communication. The customer voice portal 104 may further instruct the gateway 103 that the communication has been transferred to an agent communication device 202. The customer voice portal 104 may instruct the switch 201 and the gateway 103 using a control signal sent using a protocol such as SIP, for example.

The agent communication device 202 may receive IP packets associated with the communication from the gateway 103. Similarly, the agent communication device 202 may generate IP packets associated with the communication, and the generated IP packets may be received by the gateway 103, converted into a format suitable for the communication device 101 by the gateway 103, and forwarded to the communication device 101 as the communication.

The gateway 103 may further direct the IP packets associated with the communication to the recording device 105 to be recorded. As described above with respect to FIG. 1, the IP packets associated with the communication between the communication device 101 and the customer voice portal 104 was recorded by the gateway 103 by directing the IP packets associated with the communication to the recording device 105. After the communication was transferred to the agent communication device 202, the gateway 103 may continue to record the communication by directing the IP packets associated with the communication between the agent communication device 202 and the communication device 101 to the recording device 105. Further, any subsequent transferring of the communication to other agent communication devices 202 (e.g., a call agent transfers the communication to a manager or supervisor) may still result in the in the gateway 103 directing the IP packets associated with the communication to the recording device 105. Thus, after the communication has completed, an administrator or supervisor may listen to the recorded communication in its entirety beginning with the recording of the communication between the communication device 101 and the customer voice portal 104 through the various agent communication devices 202 that may take part in the communication.

Figure 3:
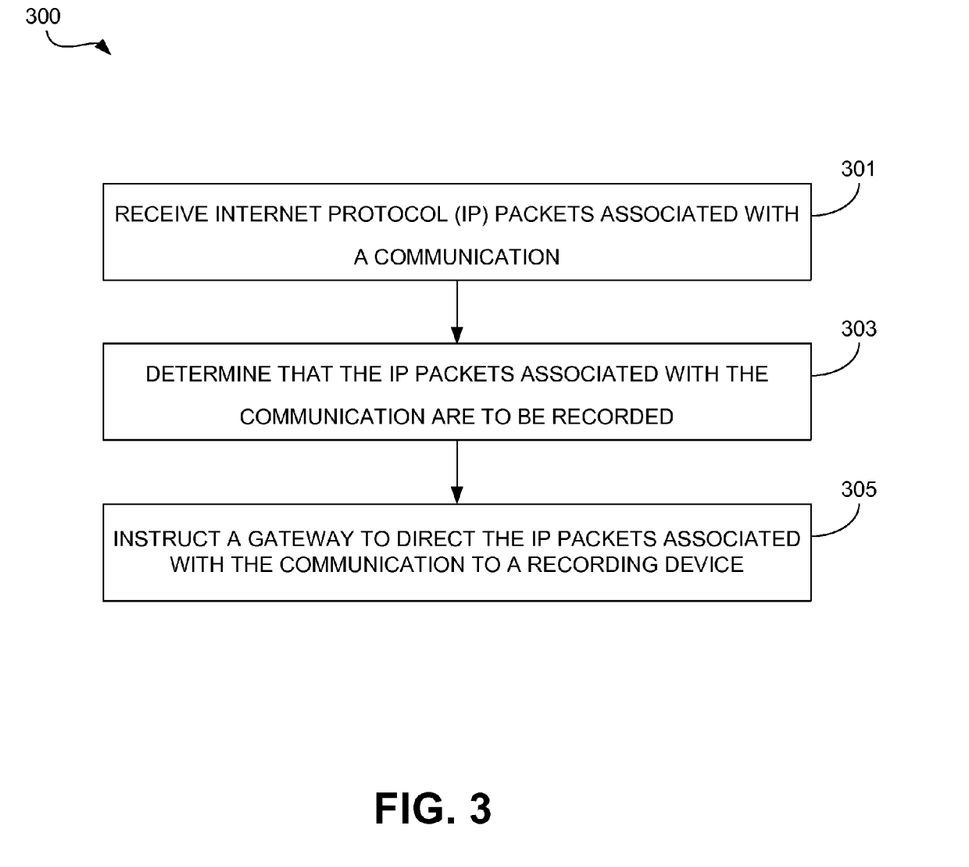
FIG. 3 is an illustration of a method for providing recording as a network service.

FIG. 3 is an illustration of a method 300 for providing recording as a network service. The method 300 may be implemented by systems such as the systems 100 and 200 illustrated in FIGS. 1 and 2.

IP packets associated with a communication are received (301). The IP packets may be received by the customer voice portal 104 from the gateway 103. The IP packets may be associated with a communication originating at a communication device 101, for example.

A determination is made that the IP packets associated with the communication are to be recorded (303). The determination may be made by the customer voice portal 104 or the gateway 103, for example. The determination may be based on variety of factors including customer responses received through an IVRS, the duration of the communication, and an AIN or DNI Associated with communication, for example.

A gateway is instructed to direct the IP packets associated with the communication to a recording device (305). The gateway may be a gateway such as the gateway 103, and may be instructed to direct the IP packets associated with the communication to the recording device 105 by the customer service portal 104, for example.

Figure 4:
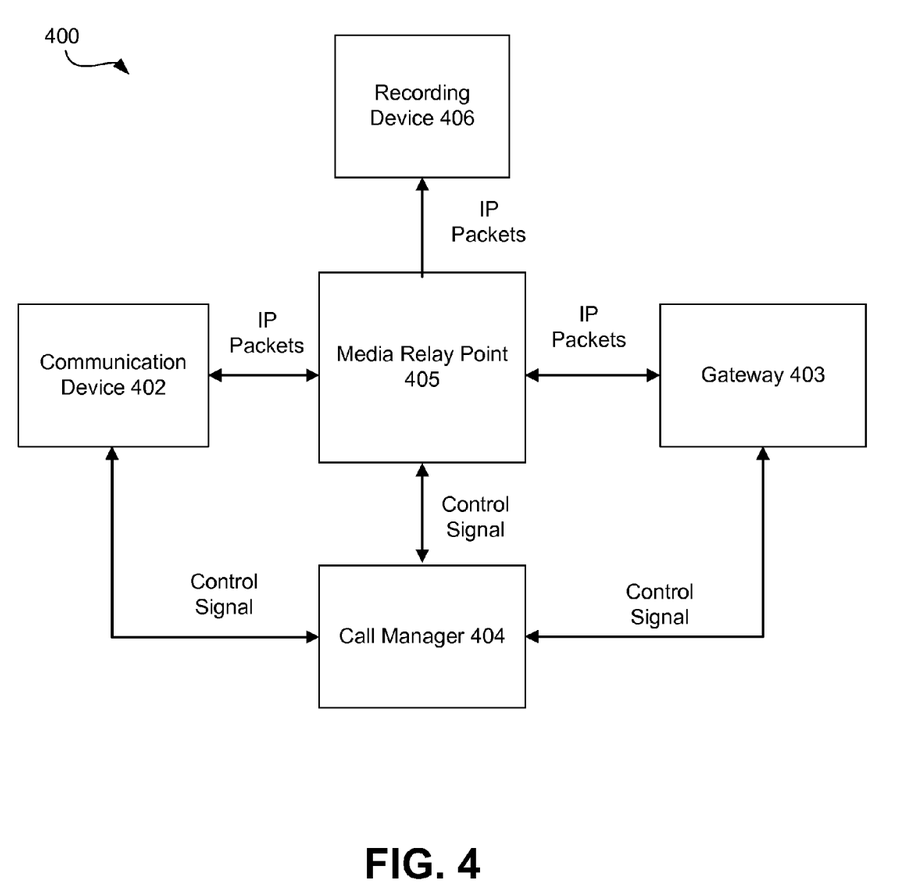
FIG. 4 is an illustration of an example system for providing network services using a media relay point.

FIG. 4 is an illustration of an example system 400 for providing network services using a media relay point. As shown, the system 400 includes a communication device 402. The communication device 402 may be implemented using a variety of network devices capable of communication through IP packets such as VoIP, for example. The communication device 402 may be a telephone, handset, cell phone, or a computer (e.g., desktop, laptop, or other type of portable computer) running communication software such as a soft phone, for example. A variety of other types of communication devices may be used.

The communication device 402 may send and receive control signals to and from a call manager 404. The call manager 404 may be implemented on a network device and may control the routing of communications on a network. For example, the call manager 404 may control the routing of IP packets between the communication device 402 and another communication device 402 (not shown) on the network. The control signal may be sent using a control protocol such as SIP, for example. Other types of protocols may also be used.

The network may further include a gateway 403. The gateway 403 may receive communications from outside the network and convert the communications into a format suitable for distribution on the network (e.g., IP packets). The gateway 403 may further convert IP packets into a format suitable for communication outside the network. For example, the gateway 403 may convert the IP packets into an audio signal suitable for distribution over the PSTN.

The call manager 404 may insert one or more media replay point 405 into the network. For example, a media replay point 405 may be inserted between two network devices on the network. The media replay point 405 may be configured to direct IP packets that pass through the media relay point 405 to a recording device 406. For example, the media relay point 405 may copy IP packets that pass through the media relay point 405 and direct the copies of the IP packets to the recording device 406. The recording device 406 may then record the directed IP packets, thereby effectively recording a copy of communications that pass between the two network devices.

The media relay point 405 may be configured to perform other network services by the call manager 404. In some implementations, the media relay point 405 may be configured to change a codec associated with the IP packets that pass through the media relay point 405. The media relay point 405 may change the codec of IP packets that pass through it, or the media relay point 405 may only change the codec on the copies of the IP packets that it directs to the recording device 406, for example.

In some implementations, the media relay point 405 may encrypt the IP packets that pass through the media relay point 405. The media relay point 405 may encrypt the IP packets that pass through it, or the media relay point 405 may only encrypt the copies of the IP packets that it directs to the recording device 406, for example.

The media relay point 405 may be implemented using a variety of network devices. For example, the media relay point 405 may be a software module executed at a network device connected to the network such as a switch, a router, a gateway, or another network device. The call manager 404 may insert the media relay point 405 between two network devices by activating the media relay point 405 software module at a network device located between the two network devices on the network.

The media relay point 405 may provide for support of advanced network service on a network to one or more legacy network devices or to one or more third party network devices that may not support particular network services. For example, a network may include a legacy communication device 402. In particular, the communication device 402 may not support recording as a network service. In order to provide for the recording of communications between the communication device 402 and other network devices on the network, the call manager 404 may activate a media relay point 405 on a network device located between the communication device 402 and the rest of the network. The media relay point 405 may then direct copies of the IP packets traveling between the communication device 402 and the rest of the network to a recording device 406, effectively providing recording as a network service to the legacy communication device 402. Other network services such as encryption, compression, Dual Tone Multi-Frequency (DTMF) support, and support for new or advanced codecs may be similarly provided to a legacy communication device 402 by the media relay point 405.

Figure 5:
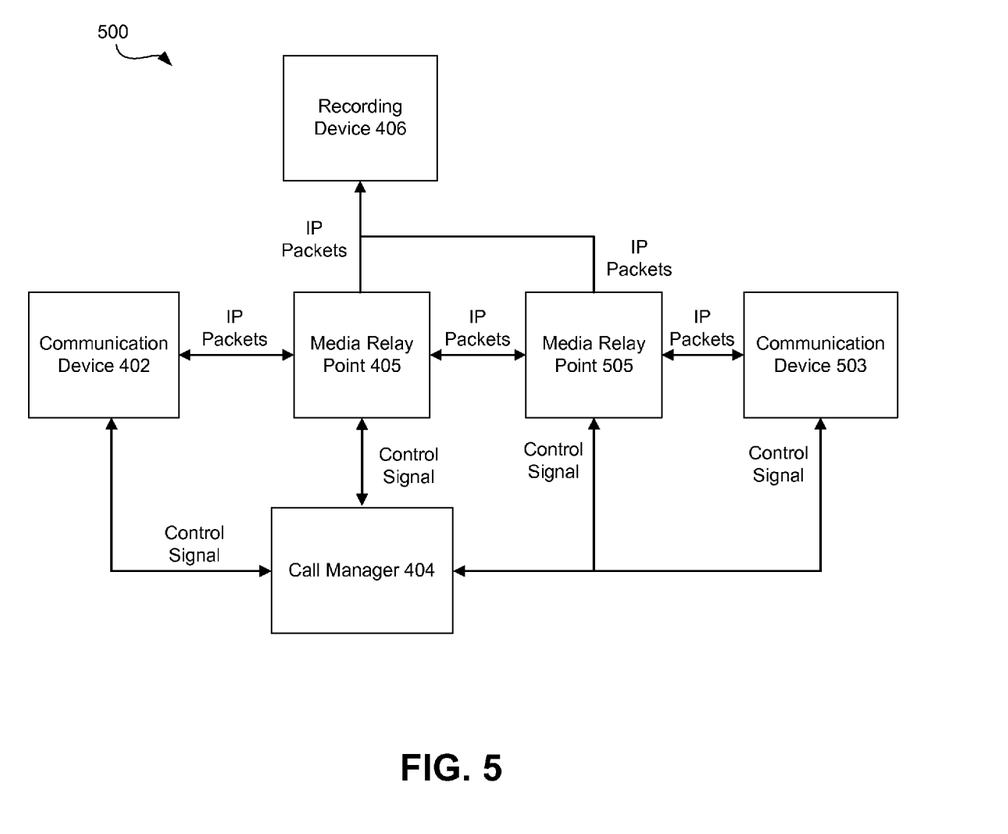
FIG. 5 is another illustration of an example system for providing network services using a media relay point.

FIG. 5 is an illustration of an example system 500 for providing network services using a media relay point. As shown, the system 500 includes the communication device 402, the media relay point 405, the call manger 404, and the recording device 406 of the system 400 described above in FIG. 4. In addition, the system 500 includes a communication device 503 and a media relay point 505.

As shown, the system 500 is configured to support multiple media relay points (e.g., media relay points 405 and 505). A call manager 404 may desire to enable a network service, such as recording, on the network. However, the network may include multiple legacy devices on the network, such as communication devices 402 and 503 that are either not capable of supporting the network service, or that are not sufficiently under the control of the call manager 404 to implement such a service.

In order to support the network services at the communication devices 402 and 503, the call manager has inserted media relay points 405 and 505 into the network. For example, the call manager 404 may have enabled media relay point 405 on a switch, or other network device, that receives IP packets from the communication device 502, and enabled media relay point 505 on a switch, or other network device, that receives IP packets from communication 503. The media relay points are each desirably implemented at the network device closest to the particular communication device such that substantially all IP packets sent to, or received from, the particular communication device may be captured by the media relay points.

As shown, the media relay point 405 has been inserted at the network device closest to the communication device 402 and the media relay point 505 has been inserted at the network device closest to the communication device 503. Where the desired network service is recording, the media relay point 405 may direct copies of IP packets received from, and sent to, the communication device 402 to the recording device 406. Similarly, the media relay point 505 may direct copies of IP packets received from, and sent to, the communication device 503 to the recording device 406.

While only two media relay points are illustrated in FIG. 5, it is for illustrative purposes only. There is no limit to the number of media relay points that may be supported by the system 500. By using media relay points, a network may provide advanced network services (e.g., recoding, codecs, encryption, compression, etc.) to legacy network devices or third-party network devices on a network.

Figure 6:
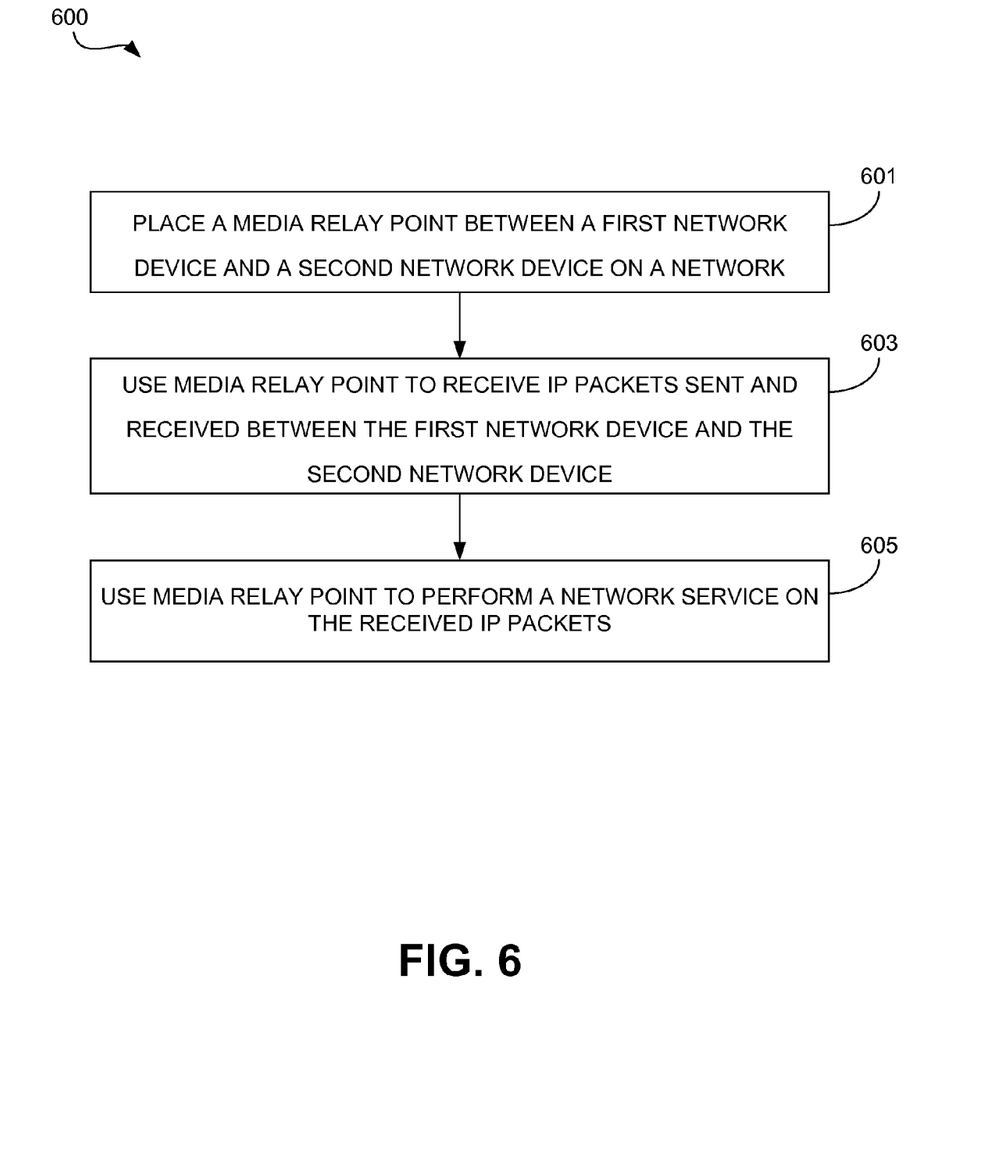
FIG. 6 is an illustration of an example method for providing network services using a media relay point.

FIG. 6 is an illustration of an example method 600 for providing network services using a media relay point. The method 600 may be implemented by the call manager 404 of the system 500, for example.

A media replay point is placed between a first network device and a second network device on a network (601). The media relay point may be placed on the network by the call manager 404 illustrated in FIGS. 4 and 5, for example. In some implementations, the media relay point may be placed on the network by loading and/or activating a media relay point software module on a network device located at a point on the network between the first and second network devices.

The media relay point is used to receive IP packets sent and received between the first network device and the second network device (603). The media relay point may be instructed by the call manager 404 to receive packets sent and received between the first and the second network device in order to implement a network service.

The media relay point is used to perform a network service on the received IP packets (605). The network services implemented by the media relay point may include encryption, compression, codec support, and recording services. Other network services may all be supported. Where the network service is recording, the media relay point may copy the IP packets and direct the copied IP packets to a recording device on the network.

Figure 7:
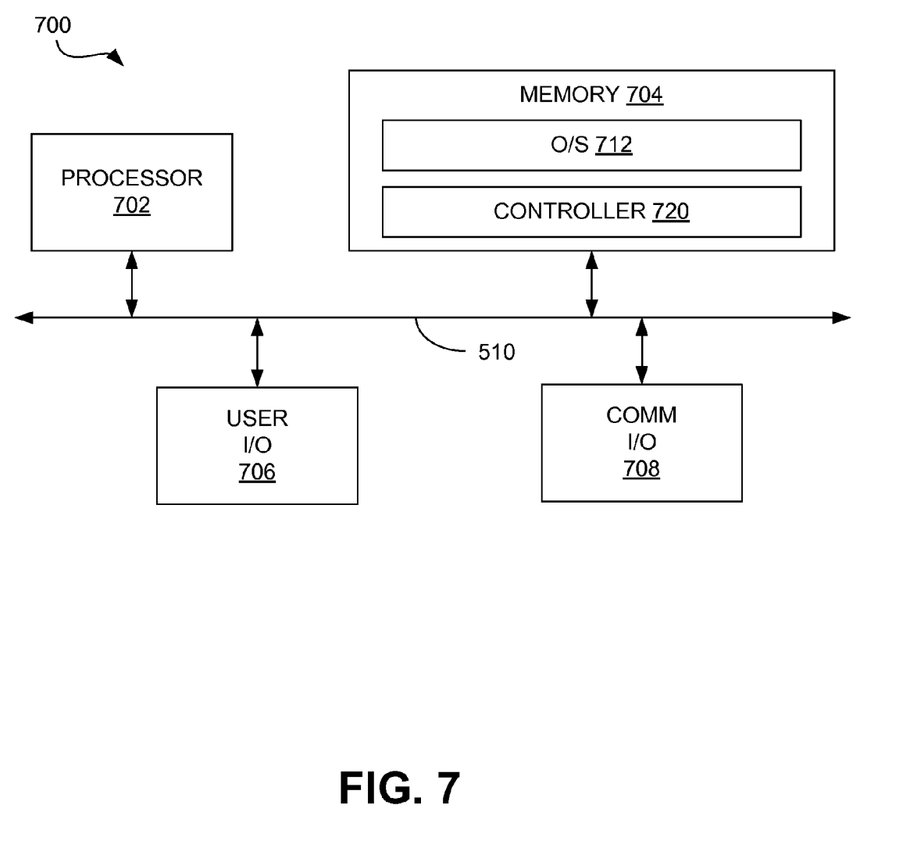
FIG. 7 is a block diagram of an example computer system that can be used to implement the systems and methods described herein.

FIG. 7 is a block diagram of an example computer system 700 that can be used to implement the systems and methods described herein. For example, the gateway and the media replay point described above may be implemented using the system 700.

Generally, in terms of hardware architecture, computer system 700 includes a processor 702, memory 704, a user interface 706, and one or more input and/or communication (I/O) device interface(s) 708 that are communicatively coupled via a local interface 710. The local interface can include, for example but not limited to, one or more buses or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor 702 may be a hardware device for executing software, particularly software stored in memory 704. In this regard, the processor can be a custom made or commercially available processor, a central processing unit (CPU), a semiconductor based microprocessor (in the form of a microchip or chip set), a macroprocessor, or generally any device for executing software instructions.

The memory 704 can include one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory can include an operating system 712, as well as instructions associated with a gateway or media relay point.

The software in memory may include one or more separate programs, each of which includes an ordered listing of executable instructions for implementing logical functions. The operating system can be configured to control the execution of other computer programs and provides scheduling, input-communication control, file and data management, memory management, and communication control and/or related services.

It should be noted that a system component embodied as software may also be construed as a source program, executable program (object code), script, or any other entity comprising a set of instructions to be performed. When constructed as a source program, the program is translated via a compiler, assembler, interpreter, or the like, which may or may not be included within the memory, so as to operate properly in connection with the operating system.

When the computer system 700 is in operation, the processor is configured to execute software stored within the memory, to communicate data to and from the memory, and to generally operate pursuant to the software. Software in memory, in whole or in part, is read by the processor, perhaps buffered, and is then executed. In this regard, when executing instructions, the example functionality described above may be performed.

It should be noted that any of the executable instructions, such as those depicted functionally in the accompanying flowcharts, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of implementations of this disclosure can include embodying the functionality described in logic embodied in hardware or software-configured media.

It should also be noted that the flowcharts included herein show the architecture, functionality and/or operation of implementations that may be configured using software. In this regard, each block can be interpreted to represent a module, segment, or portion of code, which comprises one or more executable instructions for implementing the specified logical function(s). It should also be noted that in some alternative implementations, the functions noted in the blocks may occur out of the order depicted. For example, two blocks shown in succession may in fact be executed substantially concurrently or the blocks may sometimes be executed in the reverse order, depending upon the functionality involved.

It should be emphasized that the above-described implementations are merely possible examples of implementations set forth for a clear understanding of the principles of this disclosure. Many variations and modifications may be made to the above-described implementations without departing substantially from the spirit and principles of the disclosure. All such modifications and variations are intended to be included herein within the scope of this disclosure.

Therefore, at least the following is claimed:

1. A method for providing recording as a network service comprising:
   receiving Internet Protocol (IP) packets associated with a communication at a gateway;
   communicating control information between the gateway device and a customer voice portal;
   determining at the customer voice portal that the communication is to be transferred to an agent communication device by the gateway, and that the IP packets associated with the communication are to be recorded in accordance with predetermined business rules; and
   instructing the gateway, using a Session Initiation Protocol (SIP) control protocol, to transfer the communication to the agent communication device, and to direct the IP packets associated with the communication to a recording device, the gateway providing additional tagging information associated with the communication to the recording device.

2. The method of claim 1, wherein one or more of the IP packets associated with the communication includes a response from the customer voice portal, and determining that the IP packets associated with the communication are to be recorded if the response from the customer voice portal matches one or more predetermined responses.

3. The method of claim 1, wherein the communication is associated with an associated Automatic Number Identifier (ANI) and determining that the IP packets associated with the communication are to be recorded if the ANI associated with the communication matches a specified ANI.

4. The method of claim 1, wherein the communication is associated with a network destination, and determining that the IP packets associated with the communication are to be recorded if the network destination associated with the communication matches a specified network destination.

5. The method of claim 1, wherein determining that the IP packets associated with the communication are to be recorded comprises randomly determining that IP packets associated with the communication are to be recorded.

6. The method of claim 1, further comprising instructing the gateway to change a codec associated with the IP packets.

7. The method of claim 1, further comprising instructing the gateway to encrypt the IP packets.

8. The method of claim 1, further comprising instructing the gateway to modify the size of the IP packets.

* * * * *